United States Patent
Steely, Jr. et al.

(10) Patent No.: US 7,409,503 B2
(45) Date of Patent: Aug. 5, 2008

(54) REGISTER FILE SYSTEMS AND METHODS FOR EMPLOYING SPECULATIVE FILLS

(75) Inventors: Simon C. Steely, Jr., Hudson, NH (US); Gregory Edward Tierney, Chelmsford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 430 days.

(21) Appl. No.: 10/756,644

(22) Filed: Jan. 13, 2004

(65) Prior Publication Data

US 2005/0154835 A1    Jul. 14, 2005

(51) Int. Cl.
G06F 9/00 (2006.01)
G06F 9/38 (2006.01)
G06F 13/00 (2006.01)

(52) U.S. Cl. ............. 711/141; 711/146; 711/118; 711/117; 711/100; 712/217; 712/216; 712/1

(58) Field of Classification Search .................. None
See application file for complete search history.

(56) References Cited

U.S. PATENT DOCUMENTS

| | | | |
|---|---|---|---|
| 5,197,132 A | 3/1993 | Steely, Jr. et al. | |
| 5,222,224 A | 6/1993 | Flynn et al. | |
| 5,404,483 A | 4/1995 | Stamm et al. | |
| 5,420,991 A * | 5/1995 | Konigsfeld et al. | 711/150 |
| 5,491,811 A * | 2/1996 | Arimilli et al. | 711/144 |
| 5,519,841 A | 5/1996 | Sager et al. | |
| 5,625,829 A | 4/1997 | Gephardt et al. | |
| 5,651,125 A * | 7/1997 | Witt et al. | 712/218 |
| 5,721,855 A | 2/1998 | Hinton et al. | |
| 5,802,577 A | 9/1998 | Bhat et al. | |
| 5,829,040 A | 10/1998 | Son | |
| 5,845,101 A | 12/1998 | Johnson et al. | |
| 5,875,467 A | 2/1999 | Merchant | |
| 5,875,472 A | 2/1999 | Bauman et al. | |
| 5,958,019 A | 9/1999 | Hagersten et al. | |
| 6,032,231 A | 2/2000 | Gujral | |
| 6,055,605 A | 4/2000 | Sharma et al. | |
| 6,081,887 A | 6/2000 | Steely, Jr. et al. | |
| 6,085,263 A | 7/2000 | Sharma et al. | |
| 6,108,737 A | 8/2000 | Sharma et al. | |
| 6,134,646 A | 10/2000 | Feiste et al. | |
| 6,151,671 A | 11/2000 | D'Sa et al. | |
| 6,209,065 B1 | 3/2001 | Van Doren et al. | |

(Continued)

OTHER PUBLICATIONS

Vijaykumar et al., "Speculative Versioning Cache", IEEE Transactions on Parallel and Distributed Systems, vol. 12, Issue 12, Dec. 2001 pp. 1305-1317 ☐☐.*

(Continued)

*Primary Examiner*—Sanjiv Shah
*Assistant Examiner*—Samuel Dillon

(57) ABSTRACT

Multi-processor systems and methods are provided. One embodiment relates to a multi-processor system that may comprise a multi-processor system with a processor having a processor pipeline that executes program instructions with data from speculative fills that are provided in response to source requests. The multi-processor system may comprise a first register file that retains register values associated with program instruction employing data from speculative fills, and a second register file that retains register values associated with data from speculative fills that have been determined to be coherent.

27 Claims, 9 Drawing Sheets

U.S. PATENT DOCUMENTS

| | | | |
|---|---|---|---|
| 6,275,905 B1 * | 8/2001 | Keller et al. | 711/141 |
| 6,286,090 B1 | 9/2001 | Steely, Jr. et al. | |
| 6,301,654 B1 | 10/2001 | Ronchetti et al. | |
| 6,317,811 B1 | 11/2001 | Deshpande et al. | |
| 6,345,342 B1 | 2/2002 | Arimilli et al. | |
| 6,349,382 B1 | 2/2002 | Feiste et al. | |
| 6,356,918 B1 | 3/2002 | Chuang et al. | |
| 6,408,363 B1 | 6/2002 | Lesartre et al. | |
| 6,412,067 B1 | 6/2002 | Ramirez et al. | |
| 6,457,101 B1 | 9/2002 | Bauman et al. | |
| 6,493,802 B1 * | 12/2002 | Razdan et al. | 711/144 |
| 6,535,941 B1 | 3/2003 | Kruse | |
| 6,553,480 B1 | 4/2003 | Cheong et al. | |
| 6,574,712 B1 | 6/2003 | Kahle et al. | |
| 6,591,348 B1 | 7/2003 | Deshpande et al. | |
| 6,594,821 B1 | 7/2003 | Banning et al. | |
| 6,615,343 B1 | 9/2003 | Talcott et al. | |
| 6,633,960 B1 | 10/2003 | Kessler et al. | |
| 6,633,970 B1 * | 10/2003 | Clift et al. | 712/217 |
| 6,651,143 B2 | 11/2003 | Mounes-Toussi | |
| 6,775,749 B1 * | 8/2004 | Mudgett et al. | 711/146 |
| 7,234,029 B2 * | 6/2007 | Khare et al. | 711/146 |
| 2001/0055277 A1 | 12/2001 | Steely, Jr. et al. | |
| 2002/0009095 A1 | 1/2002 | Van Doren et al. | |
| 2002/0099833 A1 | 7/2002 | Steely, Jr. et al. | |
| 2002/0099913 A1 | 7/2002 | Steely, Jr. | |
| 2002/0146022 A1 | 10/2002 | Van Doren et al. | |
| 2002/0194290 A1 | 12/2002 | Steely, Jr. et al. | |
| 2002/0194436 A1 | 12/2002 | McKenney | |
| 2002/0199067 A1 * | 12/2002 | Patel et al. | 711/145 |
| 2003/0069902 A1 | 4/2003 | Narang et al. | |
| 2003/0145136 A1 | 7/2003 | Tierney et al. | |
| 2003/0195939 A1 | 10/2003 | Edirisooriya et al. | |

OTHER PUBLICATIONS

Intel, "An Overview of Cache", Dec. 21, 1996, http://www.intel.com/design/intarch/papers/cache6.pdf.*

M. H. Lipasti, C. B. Wilkerson, and J.P. Shen. Value locality and load value prediction. In Proceedings of the Seventh International Conference on Architectural Support for Programming Languages and Operating Systems, pp. 138-147, Oct. 1--5, 1996.*

Sato, T,; Ohno, K.; Nakashima, H. A mechanism for speculative memory accesses following synchronizing operations. Parallel and Distributed Procesing Symposium, 2000. IPDPS 2000. Proceedings. 14th International.□□.*

Rajiv Gupta. The Fuzzy Barrier: a mechanism for high speed synchronization of processors. Proceedings of the third international conference on Architectural support for programming languages and operating systems. Apr. 3-6, 1989.*

□□M. Cintra, J. F. Martnez, and J. Torrellas. Architectural support for scalable speculative parallelization in shared-memory multiprocessors. In Proceedings of the 27th Annual International Symposium on Computer Architecture, Jun. 2000.*

Kozyrakis, C.E. Vector IRAM: ISA and Micro-architecture. IEEE Computer Elements Workshop, Vail, CO, Jun. 21-24, 1998.*

Gharachorloo, et al., "Memory Consistency and Event Ordering in Scalable Shared-Memory Multiprocessors", Computer Systems Laboratory, Stanford University, CA 94305, pp. 1-14.

Gharachorloo, et al., "Architecture and Design of AlphaServer GS320", pp. 1-16.

* cited by examiner

| | | |
|---|---|---|
| | REGISTER A | REGISTER VALUE #1 | — 262
| | REGISTER B | REGISTER VALUE #2 | — 264
| | REGISTER C | REGISTER VALUE #3 | — 266
| | REGISTER B | REGISTER VALUE #4 | — 268
| | REGISTER D | REGISTER VALUE #5 | — 270
| REGISTER FILE LOG INDEX → | REGISTER A | REGISTER VALUE #6 | — 272
| | REGISTER B | REGISTER VALUE #7 | — 274
| | REGISTER C | REGISTER VALUE #8 | — 276

FIG. 8

| | |
|---|---|
| REGISTER A | REGISTER VALUE #6 |
| REGISTER B | REGISTER VALUE #7 |
| REGISTER C | REGISTER VALUE #8 |
| REGISTER D | REGISTER VALUE #5 |

FIG. 9

| | |
|---|---|
| REGISTER A | REGISTER VALUE #6 |
| REGISTER B | REGISTER VALUE #4 |
| REGISTER C | REGISTER VALUE #3 |
| REGISTER D | REGISTER VALUE #5 |

FIG. 10

REGISTER FILE SYSTEMS AND METHODS FOR EMPLOYING SPECULATIVE FILLS

CROSS REFERENCE TO RELATED APPLICATIONS

This application is related to the following commonly assigned co-pending patent applications entitled: "COHERENT SIGNAL IN A MULTI-PROCESSOR SYSTEM," application Ser. No. 10/756,636; "MULTI-PROCESSOR SYSTEMS AND METHODS FOR BACKUP FOR NON-COHERENT SPECULATIVE FILLS," application Ser. No. 10/756,637; "CACHE SYSTEMS AND METHODS FOR EMPLOYING SPECULATIVE FILLS," application Ser. No. 10/756,638; "SYSTEMS AND METHODS FOR EXECUTING ACROSS AT LEAST ONE MEMORY BARRIER EMPLOYING SPECULATIVE FILLS," application Ser. No. 10/756,639; "MULTI-PROCESSOR SYSTEM UTILIZING SPECULATIVE SOURCE REQUESTS," application Ser. No. 10/756,640; "MULTI-PROCESSOR SYSTEM RECEIVING INPUT FROM A PRE-FETCH BUFFER," application Ser. No. 10/756,535; "SOURCE REQUEST ARBITRATION," application Ser. No. 10/755,919; "SYSTEMS AND METHODS FOR EMPLOYING SPECULATIVE FILLS," application Ser. No. 10/755,938; "CONSISTENCY EVALUATION OF PROGRAM EXECUTION ACROSS AT LEAST ONE MEMORY BARRIER," application Ser. No. 10/756,534, all of which are filed contemporaneously herewith and are incorporated herein by reference.

BACKGROUND

Multiprocessor systems employ two or more computer processors that can communicate with each other, such as over a bus or a general interconnect network. In such systems, each processor may have its own memory cache (or cache store) that is separate from the main system memory that the individual processors can access. Cache memory connected to each processor of the computer system can often enable faster access to data than if accessed from the main system memory. Caches are useful because they tend to reduce latency associated with accessing data on cache hits, and they work to reduce the number of requests to system memory. In particular, a write-back cache enables a processor to write changes to data in the cache without simultaneously updating the contents of memory. Modified data can be written back to memory at a later time.

Coherency protocols have been developed to ensure that whenever a processor reads or writes to a memory location it receives the correct or true data. Additionally, coherency protocols help ensure that the system state remains deterministic by providing rules to enable only one processor to modify any part of the data at any one time. If proper coherency protocols are not implemented, however, inconsistent copies of data can be generated.

Modern microprocessors employ instruction pipelines in order to increase program execution speeds. A superscalar processor is a processor that issues multiple independent instructions into multiple pipelines or execution units allowing multiple instructions to execute in parallel. A pre-fetch engine include an instruction fetch unit that fetches program instructions which are translated into micro-operands by a decoder and assigned a sequence number by a allocation unit. The instructions are streamed into multiple execution units that execute in parallel. Once executed, the instructions can be retired.

Microprocessors employ either an in-order pipeline which retires instructions in strict program order, or an out-of order pipeline which executes instructions out-of-order to increase program execution speed, but requires the re-ordering of results prior to retiring instructions. In a multi-processor system that employs a cache coherency protocol, either pipeline type will stall during an issuing of a source request as a result of a cache miss. The trend is for the ratio of the memory latency to the processor cycle time to grow in future microprocessor applications. This trend results in cache misses serviced by the system to become an increased portion of the execution time of an application.

SUMMARY

One embodiment of the present invention relates to a multi-processor system. The multi-processor system may comprise a processor having a processor pipeline that executes program instructions with data from speculative fills that are provided in response to source requests, a first register file that retains register values associated with program instruction employing data from speculative fills, and a second register file that retains register values associated with data from speculative fills that have been determined to be coherent.

Another embodiment of the present invention may comprise a processor in a multi-processor system. The processor may include a processor pipeline that executes program instructions with a speculative data fill that is received in response to a source request, and a register file backup system operative to set a register file associated with the processor to a register file state corresponding to a previous processor pipeline execution state in the event that the speculative fill is determined to be non-coherent.

Yet another embodiment of the invention relates to a multi-processor system that employs a cache coherency protocol. The system may comprise means for executing program instructions associated with a source processor employing speculative data fills received in response to source requests, means for storing executed register entries associated with writing register values into registers of a first register file based on speculative data fills, means for writing register values associated with the executed register entries into a second register file if a speculative data fill associated with the executed register entries is determined to be coherent, and means for setting the first register file to a backup point if a speculative fill is determined to be non-coherent.

Still another embodiment of the invention may comprise a method of executing program instructions employing a speculative fill in a multi-processor system. The method may include executing program instructions with data from a speculative fill that is provided in response to a source request, storing executed register entries in a log associated with executed register write instructions based on data from the speculative fill, and writing register values associated with a respective executed register entry from the log to an associated register in a retire-time register file, if data from the speculative fill associated with an executed register entry has been determined to be coherent.

Still another embodiment of the invention may comprise another method of executing program instructions employing a speculative fill in a multi-processor system. The method may include executing program instructions with data from a speculative fill that is provided in response to a source request, updating register values in a speculative register file based on the executed program instructions, updating register values in a retire-time register file when data corresponding to the updated register values in the speculative register file is based on a coherent speculative fill, and copying the register values of the retire-time register file to the speculative register file when data corresponding to the updated register values in the speculative register file is based on non-coherent speculative fills.

BRIEF DESCRIPTION OF THE DRAWINGS

FIG. 8 illustrates a block diagram of a log having executed register write entries.

FIG. 9 illustrates a block diagram of a speculative register file.

FIG. 10 illustrates a block diagram of a retire-time register file.

DETAILED DESCRIPTION

Figure 1:
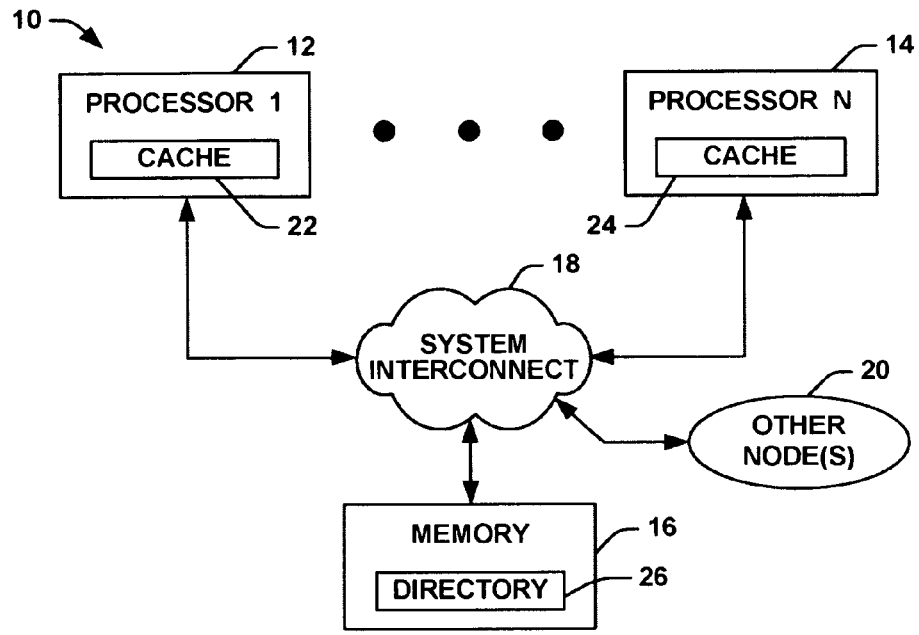
FIG. 1 depicts an example of a multiprocessor system.

This disclosure relates generally to systems and methods for processor speculation and backup in a multi-processor system. A source processor employs a speculative data fill in response to source request. A source request is a request for data associated with a cache line from the multi-processor system. The source request will be generated in response to a processor load or store instruction that experiences a cache miss, such that the requested memory block or data fill associated with a cache line does not reside in the processor's local cache. A data fill refers to a copy of a memory block associated with a given cache line. The source processor can employ one or more speculative fills or copies of the requested data to continue program instruction execution, until a coherent fill is returned from the multi-processor system. Once the coherent fill is returned, the source processor can continue execution if the speculative fill is the same as the coherent fill or backup and re-execute program instructions if the speculative fill is different from the coherent fill.

The systems and methods employ a register file system that can be set to a register file state associated with a processor backup state in the event that a speculative fill is determined to be non-coherent. For example, the processor backup state can be the state of the processor at a first user program instruction, which is a first program instruction that employs data associated with the speculative fill. Alternatively, the processor backup state can be the state of the processor at the program instruction that invokes the source request. In one embodiment, the register file system includes a first register file (e.g., a speculative register file) and a second register file (e.g., retire-time register file). The first register file retains register values associated with program instructions employing data from speculative fills. The second register file retains register values associated with data fills that have been determined to be coherent.

In another embodiment, a log retains executed register write entries based on executed writes to registers in the first register file. Typically, a register write entry is executed when a program instruction executes an algorithm, such as a mathematical instruction, on one or more register values and writes the results into a register entry. In an in-order pipeline, an executed register write is completed when the result is written to the register. In an out-of-order pipeline, an executed register write is completed when instructions retire past any out-of-order backup possibilities.

Executed register write entries are written into the second register file if a speculative data fill associated with the register value is determined to be coherent. If data of a speculative fill is determined to be non-coherent, register values in the log associated with executed register write entries are written into the second register file to a backup point (e.g., state at a first user program instruction), and the remaining executed register write entries are flushed from the log. The register values in the second register file can be copied into the register values of the first register file to continue program instruction execution from the backup point.

FIG. 1 depicts an example of a system 10 that can employ speculative fills and backup to facilitate processor execution speed. Additionally, the system 10 can utilize a coherent signal to indicate which portion (e.g., field, block, quantum) of a given data fill is coherent. Furthermore, the system 10 can employ a coherent signal to indicate which of a plurality of responses to a plurality of requests have returned coherent copies of data fills. The system 10 illustrates a multi-processor environment that includes a plurality of processors 12 and 14 (indicated at PROCESSOR I through PROCESSOR N, where N is a positive integer (N>1)). The system 10 also includes memory 16, which can be implemented as a globally accessible aggregate memory. For example, the memory 16 can include one or more memory storage devices (e.g., dynamic random access memory (DRAM)).

The processors 12-14 and memory 16 define nodes in the system that can communicate with each other via requests and corresponding responses through a system interconnect 18. For example, the system. interconnect 18 can be implemented as a switch fabric or a hierarchical switch. Also associated with the system 10 can be one or more other nodes, indicated schematically at 20. The other nodes 20 can correspond to one or more other multi-processor systems connected to the system interconnect 18, such as through an appropriate interconnect interface (not shown).

Each of the processors 12-14 includes at least one corresponding cache 22-24. For purposes of brevity, each of the respective caches 22-24 are depicted as unitary memory devices, although they may include a plurality of memory devices or different cache levels. Each of the caches 22-24 contains a plurality of cache lines. Each cache line has an associated address that identifies corresponding data stored in the line. The cache lines can also include information identifying the state of the data for the respective lines.

The system thus employs the caches 22-24 and the memory 16 to store blocks of data, referred to herein as "memory blocks" or "data fills". A memory block or data fill can occupy part of a memory line, an entire memory line or span across multiple lines. For purposes of simplicity of explanation, however, it will be assumed that a "memory block" occupies a single "memory line" in memory or a "cache line" in a cache. Additionally, a given memory block can be stored in a cache line of one or more caches as well as in a memory line of the memory 16.

The system 10 implements a cache coherency protocol to manage the sharing of memory blocks so as to guarantee coherence of data. The cache coherency protocol of the system 10 utilizes a plurality of states to identify the state of each memory block stored in a respective cache line and the memory 16. The coherency protocol establishes rules for transitioning between states, such as if data is read from or written to memory 16 or one of the caches 22-24.

As used herein, a node that issues a source request, such as a read or write request, defines a source node. Other nodes within the system 10 are potential targets of the request. Additionally, each memory block in the system 10 can be assigned a "home node" that maintains necessary global information and a data value for that memory block. The home node can be defined as a processor (or central processing unit), associated cache and associated memory/directory.

For example, when a source node, such as the processor 12, requires a copy of a given memory block, it typically first requests the memory block from its local, private cache by identifying the address associated with the memory block. If the data is found locally, the memory access is resolved without communication via the system interconnect 18. Where the requested memory block is not found locally, the source node 12 can request the memory block from the system 10, including the memory 16. In addition to the request identifying an address associated with the requested memory block, the request usually identifies the type of request or command being issued by the requester.

By way of example, assume that the processor 12 (a source node) requires a copy of data associated with a particular address, and assume that the data is unavailable from its own local cache 22. Since the processor 12 is unable to access the data in its local cache 22, the processor 12, as the source node, transmits a source request to other nodes and memory 16 via the system interconnect 18. For example, the request can correspond to a source read request or a source write request for a memory block associated with the address identified in the request. The request also can identify what type of request is being issued by source node 12.

In a directory based cache coherency protocol, the source request is transmitted from the source processor 12 to a home node in the system 10. The home node retains location information (e.g., in a directory) of the owner of the requested cache line. The home node provides a forward signal to the owner. The owner then responds with a coherent data fill, which is received by the requester. The system 10 can also return a coherent signal indicating that the coherent data fill is the coherent copy of the requested cache line. The coherent signal can be provided before, after or concurrently with the coherent data fill. Based on the type of request, the cache coherency protocol can continue executing to change states of one or more copies of the memory block in the system.

During execution of the cache coherency protocol, the requesting node is provided with one or more data fills associated with the memory block. The data fill is a copy of the memory block associated with a requested cache line. The data fill can be a speculative fill. A speculative fill is a data fill that may or may not be the latest version of the memory block. Speculative fills can be provided by a local cache, a local processor (e.g., within a multi-processor group), a remote processor, a home node or a speculative guess structure. The speculative guess structure can be implemented by employing a speculative table, speculative engine or separate cache structure that maintains speculative copies of memory blocks.

The speculative fills allow the requesting processor to execute several thousands of program instructions ahead prior to receiving a coherent copy of the requested memory block.

Subsequent data fills can be provided to the requesting node until the coherent signal is received indicating which data fill is coherent. These subsequent data fills can be ignored. Alternatively, if the subsequent data fill is different from the speculative fill used by the source processor to continue execution, the processor can backup and re-execute program instructions. This may be the case if it is determined that a subsequent fill is more likely coherent than the original fill employed by the processor to continue execution.

Once the coherent signal is received, the source processor can determine whether the current speculative fill employed by the processor to continue execution is the same as the coherent data fill. If the coherent data fill is the same as the speculative fill, the processor can continue execution, thus mitigating latency caused by the processor remaining in an idle state until a coherent version of the requested memory block is received. If the coherent data fill is different from the speculative fill, the processor can back up and re-execute program instructions with the new data. The source then backs up and begins executing again with the new data, but loses little or no time from the execution of the speculative fill as the source would have remained latent during the retrieval of the coherent copy regardless. The cache coherency protocol can continue executing after the coherent copy is retrieved to change states of one or more copies of the memory block in the system based on the request (e.g., read, write) of the source.

Information associated with each source request is retained in the event of a processor backup. The source processor includes a cache system that can be set to a cache state and a register file system that can set to a register file state associated with a processor backup state (e.g., state of processor at first user program instruction) in the event of execution with a speculative fill that is not coherent. A pointer or index can be retained that points to a log that retains information associated with the cache corresponding to the state of the cache at the processor backup state.

Additionally, a pointer or index can be retained that points to a backup point in a register file system or a log that retains information associated with the register file corresponding to the state of the register file at the backup point. The register file system can include a speculative register file and a retire-time register file. The register file system can include a log that retains executed register write entries based on executed writes to registers in the speculative register file. Register values in the log associated with executed register write entries can be written into the retire-time register file if a speculative data fill associated with the register value is determined to be coherent.

The pointer or index can point to a point in a log that identifies a backup point, such that if data of a speculative fill is determined to be non-coherent, register values in the log associated with executed register write entries are written into the retire-time register file to the backup point, and the remaining executed register write entries are flushed from the log. The register values in the retire-time register file can then be copied into the register values of the speculative register file to continue program instruction execution from the backup point. If the processor employs an out-of-order pipeline, the register rename map that points to the backed up locations of the register file is operative to be reset during a processor backup.

The source processor also stores information associated with the state of the processor pipeline at a processor backup point. The processor backup point can be a first user program instruction that utilizes data associated with the speculative fill corresponding to the requested data. The first user program instruction can be the backup point, such that the cache backup system and the register file backup system are set to a first user point associated with the first user program instruction for re-execution. Furthermore, the state of the register load files associated with each register load instruction prior to the first user program instruction and subsequent to the data request instruction can be retained, so that the registers can be reloaded with the new coherent data.

Figure 2:
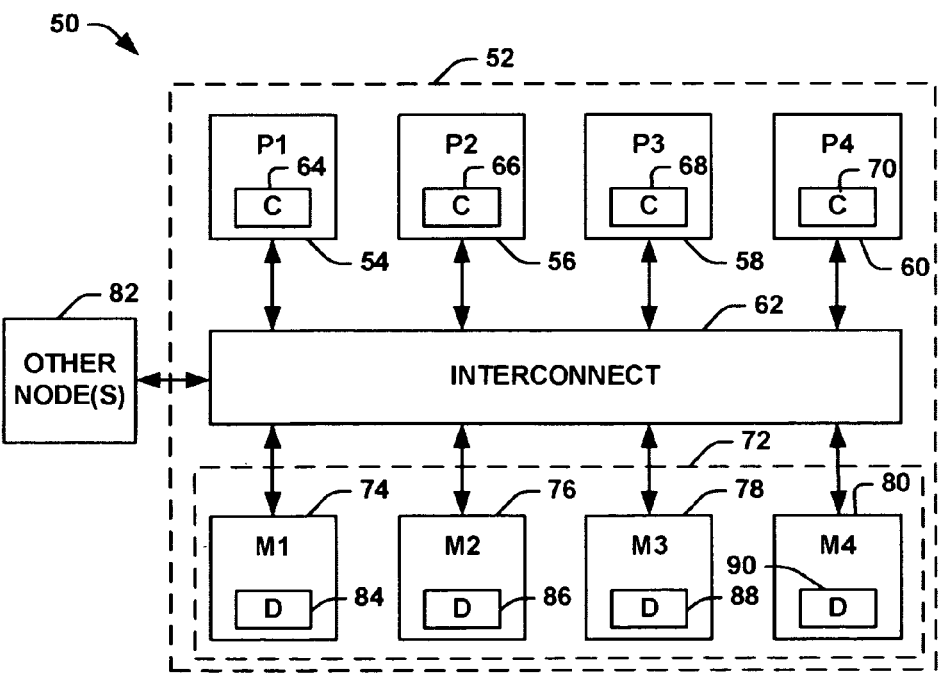
FIG. 2 depicts an example of another multiprocessor system.

FIG. 2 depicts an example of a multiprocessor computing system 50. The system 50, for example, includes an SMP (symmetric multi-processor) node 52 that includes processors (P1, P2, P3, P4) 54, 56, 58 and 60 in communication with each other via an interconnect 62. The interconnect 62 facilitates transferring data between processors and memory of the system 50. While four processors 54-60 are depicted in the example of FIG. 2, those skilled in the art will appreciate that a greater or smaller number of processors can be implemented in the node 52.

Each processor 54-60 also includes an associated cache 64, 66, 68 and 70. The caches 64-70 can enable faster access to data than from an associated main memory 72 of the node 52. The system 50 implements a cache coherency protocol designed to guarantee coherency of data in the system. By way of example, the cache coherency protocol can be implemented to include a directory based protocol in which requests for data are transmitted to a home node, which retains owner information in a directory associated with a given cache line. Alternatively, the cache coherency protocol can be implemented to include a source broadcast protocol in which a request is transmitted to all nodes in the system. Furthermore, a null-based protocol can be employed in which a home node receives a request and issues a source broadcast for the requested data.

The memory 72 can include multiple memory modules (M1, M2, M3, M4) 74, 76, 78 and 80. For example, the memory 72 can be organized as a single address space that is shared by the processors 54-60 as well as other nodes 82 of the system 50. Alternatively, each memory module 74-80 can be associated with a respective one of the processors 54-60. Each of the memory modules 72-78 can include a corresponding directory 84, 86, 88 and 90 that defines how the memory blocks are apportioned in each respective module as well as where the corresponding coherent copy of data should reside in the system 50. The coherent copy of data, for example, may reside in the home memory module or, alternatively, in a cache of one of the processors 54-60.

The other node(s) 82 can include one or more other SMP nodes associated with the SMP node 52 via the interconnect 62. For example, the interconnect 62 can be implemented as a switch fabric or hierarchical switch programmed and/or configured to manage transferring requests and responses between the processors 54-60 and the memory 70, as well as those to and from the other nodes 82.

When a processor 56 requires desired data, the processor 56 operates as a source node and issues a source request (e.g., a read request or write request) to the system 50. In a directory based protocol, a home node responds to the request by providing a forwarding signal to an owner processor. The owner processor returns a coherent copy of the data fill. The cache coherency protocol implemented in the system 50 is designed to ensure that a correct copy of the data is returned in response to the source request. The system 50 can also return a coherent signal that indicates that the copy returned from the owner processor is the coherent version of the requested data.

Furthermore, the source processor can receive speculative copies or fills of the requested data in response to the source request. The source processor can employ the speculative copy to execute several thousands of instructions ahead prior to receiving a coherent version of the data. Speculative fills can be provided by a local processor (e.g., within a multiprocessor group), a remote processor, a home node or a speculative guess structure, such as a speculative table, speculative engine or separate cache structure that maintains speculative copies of memory blocks. Subsequent data fills can be provided to the requesting node until the coherent signal is received indicating which data fill is coherent. These subsequent data fills can be ignored. Alternatively, if a subsequent data fill is different from the speculative fill used by the source processor to continue execution, the processor can backup and re-execute program instructions. This may be the case if it is determined that a subsequent fill is more likely coherent than the original fill employed by the processor to continue execution.

Each processor retains backup information associated with each source request in the event of a processor backup. Each source processor includes a cache system that can be set to a backup point and a register file system that can be set to a backup point in the event of execution with a speculative fill that is not coherent. A pointer or index can be retained that points to a backup point of the cache system or a log that retains information associated with the cache state at the backup point if a processor executes with a non-coherent speculative data fill.

Additionally, a pointer or index can be retained that points to a backup point of the register file or a log that retains information associated with the register file at a backup point if the processor executes with a non-coherent speculative data fill. For example, a register file system can include a speculative register file and a retire time file register. The register file system can include a log that retains executed register write entries based on executed writes to registers in the speculative register file. Register values in the log associated with executed register write entries can be written into retire-time register file if a speculative data fill associated with the register value is determined to be coherent.

A pointer or index can point to a point in the log that identifies a backup point, such that if data of a speculative fill is determined to be non-coherent, register values in the log associated with executed register write entries are written into the retire-time register file to the backup point, and the remaining executed register write entries are flushed from the log. The register values in the retire-time register file can then be copied into the register values of the speculative register file to continue program instruction execution from the backup point. If the processor employs an out-of-order pipeline, the register rename map that points to the backed up locations of the register file is operative to be reset during a processor backup.

The source processor also stores information associated with the state of the processor pipeline when a first user program instruction associated with the requested data is encountered. The first user program instruction can be the processor backup point. Furthermore, the state of the register load files associated with each register load instruction prior to encountering the first user program instruction can be retained, so that the registers can be reloaded with the new coherent data to be set in a state associated with the backup point.

Once a coherent data fill is received in response to a source request, the source processor can determine whether the current speculative fill employed by the source processor is the same as the coherent data fill. If the coherent data fill is different from the speculative fill, the processor can back up and re-execute program instructions with the new data. The processor can back up its associated pipeline by setting the program counter to the first user program instruction, setting the cache system to a cache state at the first user program instruction, and setting the register file system to a register file state at the first user program instruction. Additionally, loaded register files can be reloaded with the coherent fill data.

In an alternate embodiment, a comparison is performed between bytes of the coherent data fill and the speculative fill that are employed by the processor pipeline. If none of the bytes employed by the processor pipeline are different between the speculative fill and the coherent data fill, the coherent data fill is loaded in the cache but no backup occurs. If bytes employed by the processor pipeline are different between the speculative fill and the coherent data fill, the coherent data fill is loaded into the cache and a backup occurs.

Figure 3:
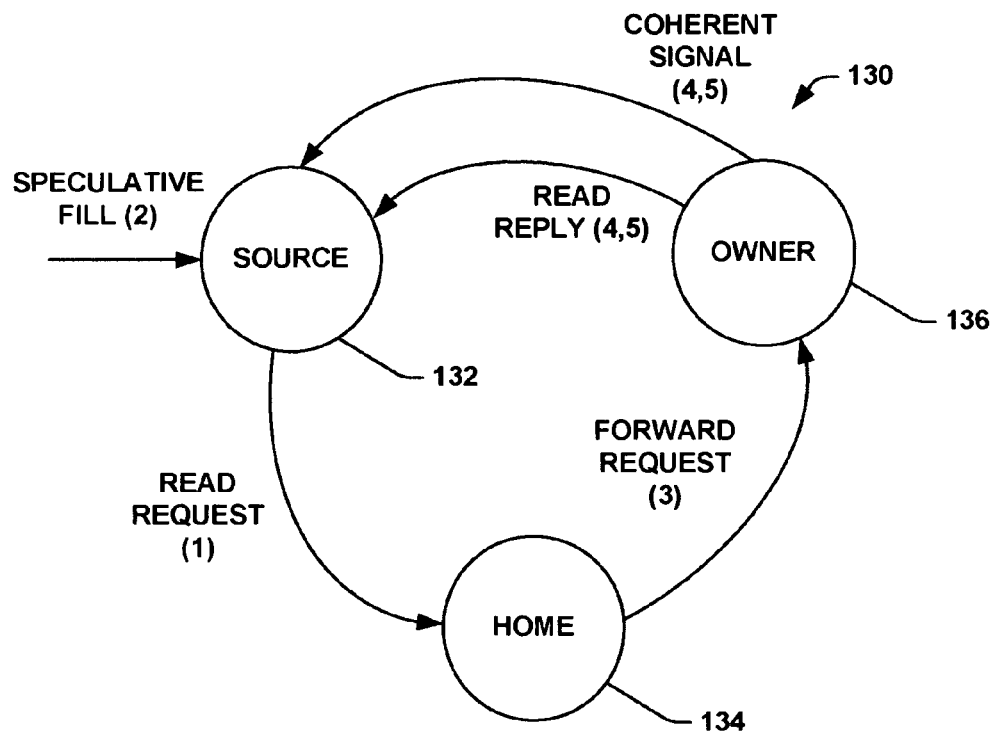
FIG. 3 illustrates a system diagram associated with a source read request.

FIG. 3 illustrates a system diagram 130 associated with a source read request in the event of a cache miss in a multi-processor system. The system diagram includes reference numerals (1-5) that indicate one or more communication orders associated with the system diagram. A source node or processor 132 initiates a read request, which is received by a home node 134. The home node 134 retains information indicating the owner of the requested cache line. This information is stored in a directory in memory associated with the home node 134. The source read request is also received by one or more other entities and/or structures of the multi-processor system.

For example, one or more local processors (e.g., a processor part of a multi-processor group or node), a remote processor, or some other local or remote structure residing in a multi-processor group with the source. At least one or more of these other entities and/or structures provide copies of the requested cache line to the source. The copies of the requested cache line are referred to as speculative fills, since it is not known at this time whether or not these copies are coherent. One of the speculative fills are employed by the source processor to continue executing its program instructions. The source processor also retains information to allow the processor pipeline to backup in the event the speculative fill employed by the processor pipeline is not coherent.

The multi-processor system continues execution of its cache coherency protocol, while the source processor executes with the speculative fill. The home node 134 determines the owner 136 of the cache line requested from a home directory. The owner 136 of the cache line is the node or processor that has the latest version of the cache line. The latest version of the cache line can reside in a cache associated with a local or remote processor, or the latest version of the cache line can reside in memory. The owner can be a cache associated with a processor or a memory associated with the system or one or more processors. The home node 134 then provides a forward request to the owner 136. The owner 136 provides a read reply by providing a coherent copy of the requested data associated with the requested cache line to the source 132.

A coherent signal is provided to the source. The coherent signal is an indicator that provides an indication to the source that the copy provided by the owner is the coherent version of the cache line. In the example of FIG. 3, the coherent signal is provided by the owner. However, the coherent signal can be provided by control logic associated with the multi-processor system, by the home node 136 or by some other structure in the multi-processor system. The coherent signal can be a structure such as a data packet, or a tag associated with each data fill that is marked to indicate which of the data fills are coherent, or a tag associated with only the coherent version of the cache line. The coherent signal can be a mask or vector that indicated which portions (e.g., data fields, data quantums, data blocks) of a data fill are coherent. Additionally, the coherent signal can be a mask or vector that indicates which of a plurality of responses to a plurality of requests have returned coherent copies. The coherent signal can be sent prior to, after or concurrently with the coherent version of the cache line.

In response to the source receiving the coherent signal, a comparison is performed of the coherent fill and the speculative fill employed by the source to continue program execution. If the coherent data fill is different from the speculative fill, the source can back up the program counter to the first user program instruction, reset the cache, register files and register map to a backup point, reload the registers associated with the requested data and re-execute program instructions with the new coherent data. If the coherent data fill is the same as the speculative fill, the source can continue execution of program instructions, which can be several thousand instructions ahead of where the program would be without employing the speculative fill.

Alternatively, a comparison can be performed between bytes of the coherent data fill and the speculative fill that are employed by the processor pipeline. If none of the bytes employed by the processor pipeline are different between the speculative fill and the coherent data fill, the coherent data fill is not sent to the processor pipeline and no backup occurs. If bytes employed by the processor pipeline are different between the speculative fill and the coherent data fill, the coherent data fill is sent to the processor pipeline and a backup occurs.

Figure 4:
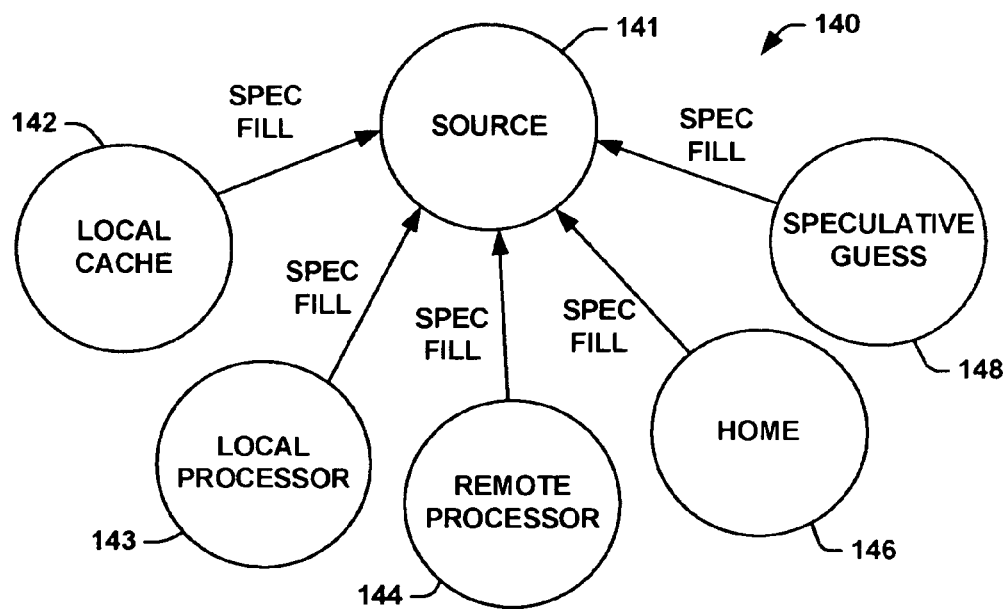
FIG. 4 illustrates a system diagram associated with a source node or processor receiving speculative fills.

FIG. 4 illustrates a system diagram 140 associated with a source node or processor 141 receiving speculative fills in response to a source request in the event of a cache miss in a multi-processor system. The source node or processor 141 can receive speculative fills from a local cache 142. The local cache 142 may have a copy of the memory block, which may or may not be the same as the coherent version residing somewhere in the multi-processor. This can occur in an upgrade miss, which by definition means that there is already a copy of the memory block in the local cache 142, such that the copy of the memory block can serve as a speculative fill. When the upgrade miss returns, a coherent signal will occur if the upgrade occurred to the value that was already present in the cache. If a new value is obtained, the new value will cause the source 141 to backup and re-execute program instruction with the new value.

Another example, is a full-block write where by definition all data values in a memory block associated with a cache line are going to be written by the execution stream. In this example, the system returns an acknowledgement that the line is coherent (all other copies have been invalidated). Similar to upgrade misses, the source begins executing upon receiving a full-block miss. When the system returns a coherent signal, the coherent signal is passed to the source 141 to allow instructions to start retiring.

The source node or processor 141 can receive speculative fills from a local processor 143. A local processor 143 is a processor that is within a node or multi-processor group with the source 141. The local processor 143 may have a copy of the cache line in its cache, which may be a stale version or a coherent version. The local processor 143 can provide this copy in the form of a speculative fill to the source. Additionally, a speculative fill can be provided by a remote processor 144 that can provide a speculative fill prior to the time necessary in providing the coherent fill. A remote processor is a processor that is not within a node or multi-processor group with the source 141. A home node 146 or processor can also provide a speculative fill.

The multi-processor system can also include a speculative guess structure 148 operative to provide speculative fills. For example, the speculative guess structure 148 can be a speculative engine can be employed to provide speculative fills in response to source requests. The speculative engine can be a dedicated processor and/or memory that returns speculative copies of cache lines. The speculative guess structure 148 can be a storage structure local to the source processor 141 that maintains speculative copies of cache lines in a table or some other form. The speculative guess structure 148 can monitor cache copies transmitted over the system, such that the speculative fills are similar to a substantial portion of the coherent fills transmitted over the system.

Figure 5:
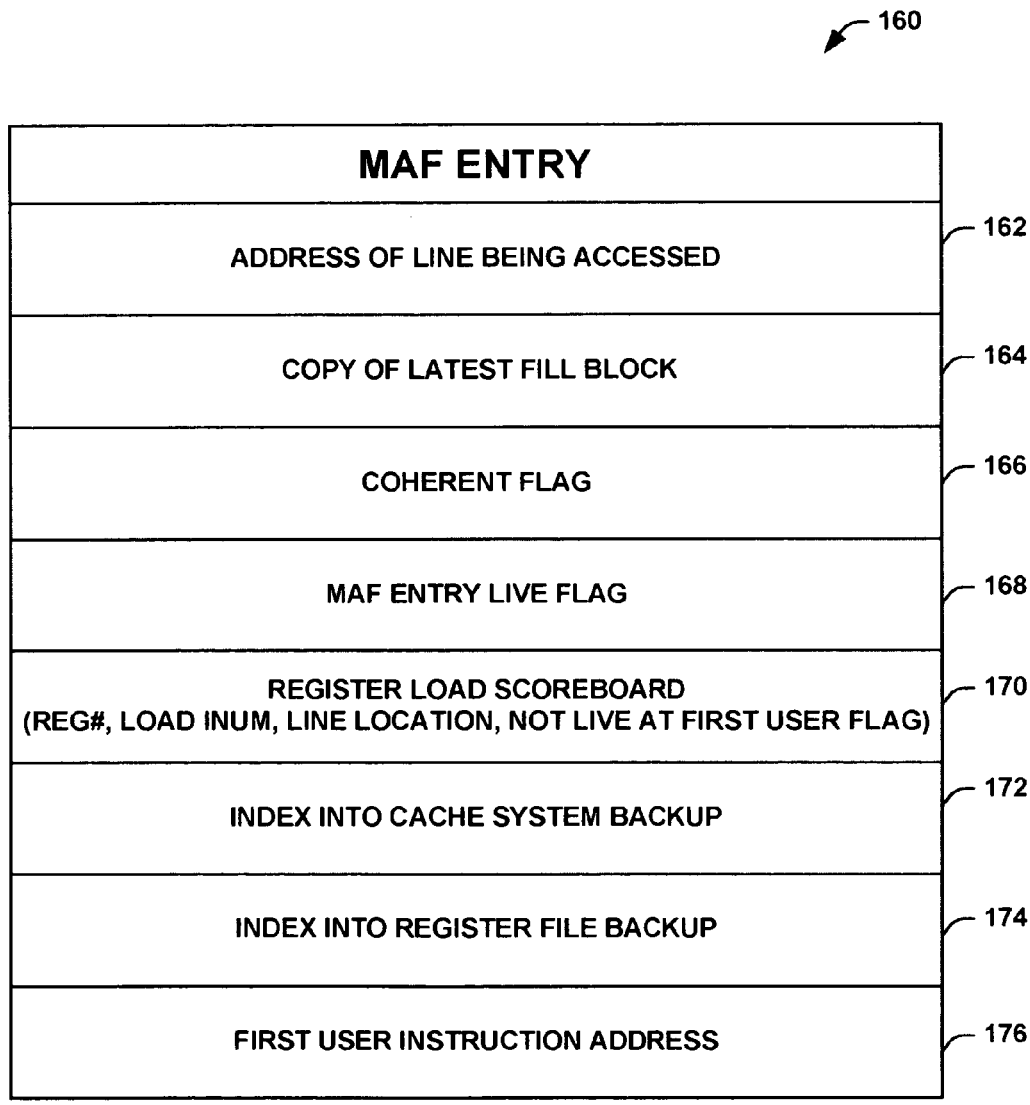
FIG. 5 illustrates a block diagram of a miss address file (MAF) entry.

FIG. 5 illustrates a block diagram of a miss address file (MAF) entry 160 that can be employed to initiate backup of a processor pipeline in the event of execution of a speculative fill that is not coherent. A MAF entry is generated by a source each time a source request for a new cache line is generated over the system. The MAF entry 160 contains fields associated with an outstanding request corresponding to a cache miss for a respective cache line. The MAF fields can include the cache line address being requested 162, the copy of the latest fill block 164 returned by the system and a coherent flag 166 that provides an indication of whether or not the coherent signal has been received.

The MAF entry 160 also includes fields for initiating a backup of the processor pipeline. The MAF entry 160 includes a MAF entry live flag field 168. The MAF entry live flag 168 indicates that a first user program instruction has been encountered by the processor pipeline. The first user program instruction is the first instruction that employs the requested data. The MAF entry 160 also includes a register load scoreboard 170. The register load scoreboard 170 includes entries for each register that is a destination of a load instruction prior to encountering the first user program instruction and subsequent to an instruction that causes the source request. Each entry in the scoreboard includes a register number, a load inum number which is a unique ascending number assigned at load time, a location in the cache line accessed by the load instruction associated with the respective register and a not live at first user flag. The not live at first user flag is a flag that indicates whether or not a register was overwritten before the first user program instruction has been encountered.

The MAF entry 160 also includes an index into the cache backup system field 172. This index can be a pointer into a log or a cache backup file associated with the state of the local cache at a backup point. The MAF entry 160 also includes an index into the register file backup system field 174. This index can be a pointer into a log or a register backup file associated with the state of the register file at a backup point. The MAF entry 160 also includes the address of the first user program instruction field 176. The address of the first user program instruction can be employed to backup the program counter to the first user program instruction. The backup point of the cache backup system and the register file system can be associated with the state of the cache backup system and register file system at the first user program instruction.

The following program example illustrates a first user program instruction:
0001 Load R11, 12(R14) # Access address formed as 12+R14 (cache line 88000).
0002 Add R16, R12–>R13
0003 Load R3, 24(R14) # Access 24+R14 (also in cache line at 88000)
0004 Sub R6, R7–>R2
0005 Mov R3, R8 # First use of data from cache line 88000 (accesses R3)
0006 Xor R8, #16, R8
0007 CMP R8, R11, R13

In the above example, it can be assumed that a cache miss occurs with the Load R11 instruction in line "0001" and this initiates a MAF entry for cache line 88000. When the Load R3 instruction in line "0003" is encountered a miss will also occur and is in the same cache line 88000: So a scoreboard entry will be created for the Load R3. The Mov R3 instruction in line "0005" is the first program instruction that uses either R11 or R3 and hence is the first-user program instruction in this example. However, if the Load R3 in instruction "0003" was to a different cache line than Load R11 in line "0011" then the first-user program instruction would be the CMP R8, R11 line "0007" because that is the first one to use the R11 data.

Each time a new fill is received, the source determines if the data fill in the MAF entry 160 is the same as the speculative fill utilized by the source to continue execution. If the new fill is different, the source replaces the previous data fill with the new fill. If the subsequent data fill is different from the speculative fill used by the source processor to continue execution, the processor may backup and re-execute program instructions. This may be the case if it is determined that a subsequent fill is more likely coherent than the original fill employed by the processor to continue execution.

The source also checks to see if the state of the coherent flag 166 has changed indicating that the coherent signal has been received. Once the coherent flag 166 changes state, the source can compare the coherent fill 164 stored in the MAF entry 160 with the speculative fill used to continue execution of the processor to determine if execution should continue or whether the processor needs to re-execute the program instructions with the coherent data.

If the coherent data fill is different from the speculative fill, the source can load the cache with the coherent fill, reset the cache via the index into the cache backup system, reset the register file via the index into the register file backup system, reset the register rename map (e.g., for an out-of-order pipeline), reload the registers based on the register scoreboard, back up the program counter to the first user program instruction and re-execute program instructions with the new coherent data.

If the coherent data fill is the same as the speculative fill, the source can continue execution of program instructions without the need to backup. Alternatively, a comparison can be performed of bytes from the speculative fill and the coherent fill associated with register loads in the register scoreboard. If the bytes are the same, the registers have been loaded with the correct values and a backup is not necessary. If the bytes are not the same, the registers have been loaded with the incorrect values and a backup is necessary.

Figure 6:
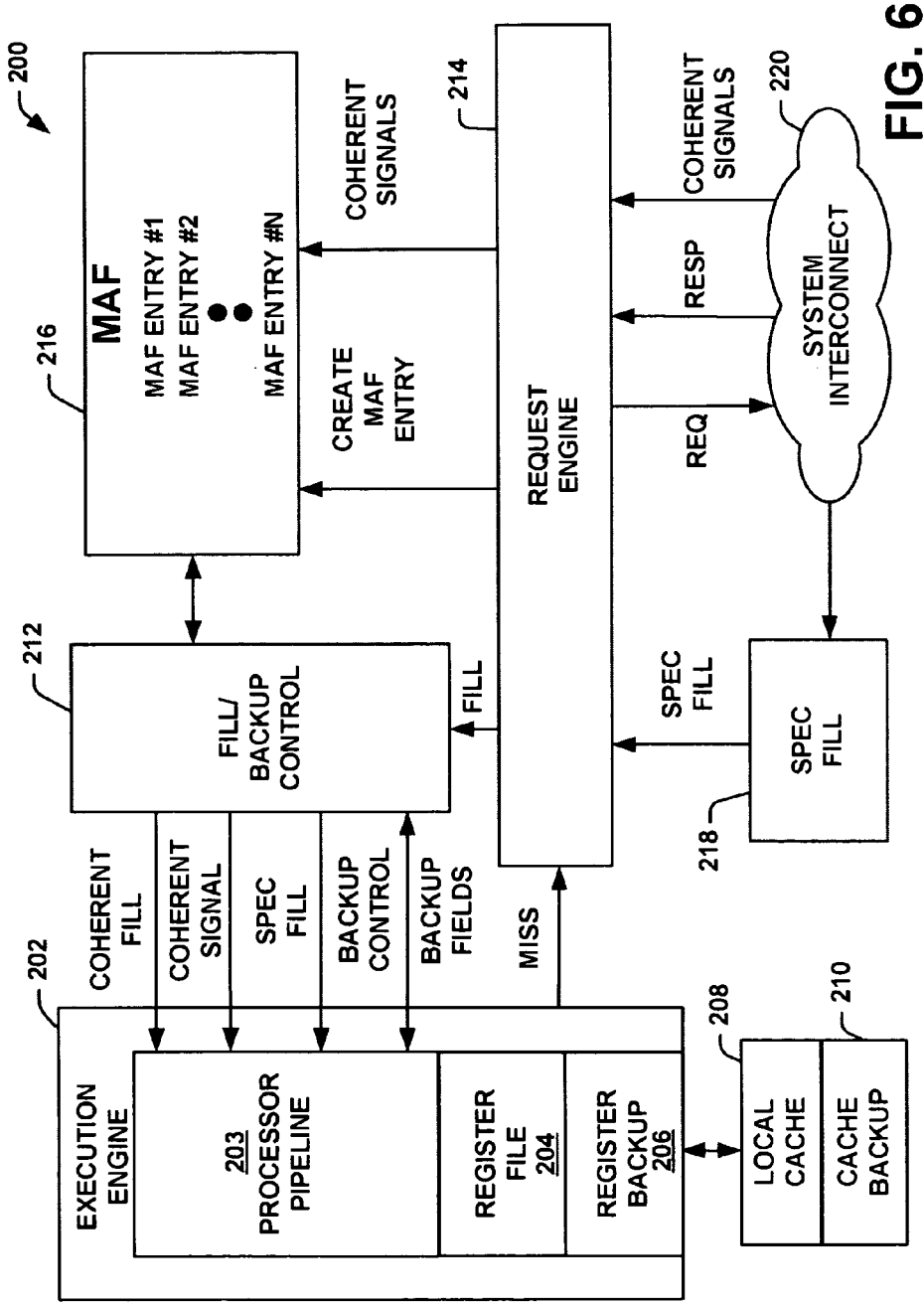
FIG. 6 depicts an example of a processor system.

FIG. 6 illustrates a processor system 200 that employs one or more MAF entries for processor speculation and backup in a multi-processor system. The system 200 includes an execution engine 202 that is executing instructions associated with a processor pipeline 203. During a load or store instruction, the execution engine 202 searches a local cache 208 to determine if the cache line associated with the load or store instruction resides in the local cache 208. If the cache line does not reside in the local cache 208, the execution engine 202 initiates a cache miss to a request engine 214. The request engine 214 determines if a previous MAF entry resides in a MAF 216. The MAF 216 can include N MAF entries, where N is an integer greater than or equal to one. Each MAF entry is associated with a source request for a cache line.

If a MAF entry associated with the cache line corresponding to the load or store instruction resides in the MAF 216, a previous unresolved source request has been issued over the system. If the processor instruction is a load instruction, the register associated with the load instruction is added to the register scoreboard associated with the previously unresolved MAF entry. Each entry in the register scoreboard includes a register number, a load inum number which is a unique ascending number assigned at load time, a location in the cache line accessed by the load instruction associated with the respective register and a not live at first user flag. The not live at first user flag is a flag that indicates whether or not a register was overwritten before the first user program instruction has been encountered.

If a MAF entry associated with the cache line corresponding to the load or store instruction does not reside in the MAF 216, the request engine 214 creates a new MAF entry and issues a source request over the system via a system interconnect 220. A MAF entry can be implemented as a table, an array, a linked list or other data structure programmed to manage and track requests for each cache line. The MAF entry includes fields that identify, for example, the address of the data being requested, the type of request, and response information received from other nodes in response to the request. The request engine 214 thus employs a MAF 216 having one or more MAF entries to manage requests issued by the request engine 214 as well as responses to such requests.

The MAF entry associated with a given source request also includes fields for initiating a backup of a processor pipeline. The MAF entry includes a MAF entry live flag field. The MAF entry live flag indicates that a first user program instruction has been encountered by the processor pipeline. The first user program instruction is the first program instruction that employs the requested data. The MAF entry also includes an index into a cache backup system 210. This index can be a pointer into a log or a cache backup file associated with the state of the local cache 208 at a backup point, for example, associated with the first user program instruction. The MAF entry also includes the address of the first user program instruction. The address of the first user program instruction can be employed to backup the program counter to the first user program instruction.

The MAF entry also includes an index into a register file backup system 206. This index can be a pointer into a log or a register backup file associated with the state of a register file 204 at a backup point. For example, the register file system can include a speculative register file employed by the processor pipeline for speculative execution. The register file backup system can include a log and a retire-time register file. The log can retain register write entries associated with register writes to the speculative register file. Register values in the log associated with executed register write entries in the log are written into a retire-time register file if a speculative data fill associated with the register value is determined to be coherent. If data of a speculative fill is determined to be non-coherent, register values in the log associated with executed register write entries are written into the retire-tine register file to a backup point (e.g., state at a first user program instruction), and the remaining executed register write entries are flushed from the log. The register values in the retire-time register file can be copied into the register values of the speculative register file to continue program instruction execution from the backup point.

A speculative fill is provided to the request engine 214 by a speculative fill structure 218 in response to a source request. The speculative fill structure 218 can be a tagless relatively large cache-like structure local or remote to the system 200. If the speculative fill structure 218 has a substantial number of entries (e.g., 32 times more entries than the local cache 204), the speculative fill structure 218 will have relatively good accuracy and a large number of speculative fills will be coherent. The entries in the speculative fill structure can be obtained by monitoring cache lines transmitted over the multi-processor system.

The speculative fill is stored in a copy of latest fill block field in the MAF entry associated with the corresponding source request via the request engine 214. A fill/backup control component 212 retrieves a copy of the speculative fill from the MAF entry and provides the speculative fill to the processor pipeline 203. The processor pipeline 203 employs the speculative fill to continue execution of program instructions. As new fills are received from the system, the fill/backup control component 212 compares the new fills with the copy of latest fill block field of the MAF entry. If the new fill is different, then the copy of the latest fill is overwritten with the new fill. These subsequent data fills can be ignored by the processor pipeline, until a coherent signal is received. Alternatively, if the subsequent data fill is different from the speculative fill used by the source processor to continue execution, the processor can backup and re-execute program instructions. This may be the case if it is determined that a subsequent fill is more likely coherent than the original fill employed by the processor to continue execution.

The fill/backup control 212 also provides an interface between the processor pipeline 203 and the MAF entry. The fill/backup control 212 analyzes the processor instructions and updates backup fields associated with the MAF entry. For example, the fill/backup control 212 will receive backup field updates such as the address of the first user program instruction for an associated source request. The fill/backup control 212 will store the address of the first user program instruction in the first user program instruction field and set the MAF entry live flag. The MAF entry live flag provides an indication that the first user program instruction has been encountered and that a coherent fill that does not match the speculative fill will cause a processor instruction backup.

The fill/backup control 212 will determine subsequent load instructions after the instruction that causes the source request and prior to the first user program instruction. The fill/backup control 212 will store the register number, the inum of the load, the location in the line accessed by the load instruction and set the not live at first user flag if the register has been overwritten by another instruction before the first user program instruction, and reset the not live at first user flag if the register has not been overwritten by another instruction before the first user-instruction. The fill/backup control 212 will also receive and store in the MAF entry an index into the cache backup system 210 and an index into the register backup system 206.

The fill/backup control component 212 monitors a coherent flag field in the MAF entry to determine if the coherent flag has changed state, which is an indication that the coherent signal has been received. Once the coherent signal is received from the system, the request engine 214 changes the state of the coherent flag field in the MAF entry.

The fill/backup control 212 detects the change in the state of the coherent fill and retrieves a copy of the latest fill block, which corresponds to the coherent version of the data fill. The fill/backup control 212 then compares the speculative fill provided by the fill/backup control 212 to the processor pipeline 203 with the coherent fill. If the coherent data fill is different from the speculative fill and the MAF entry live flag is set, the fill/backup control 212 provides the coherent fill to the processor pipeline 203. The fill/backup control 212 resets the program counter with the first user program instruction address, reset the cache backup system 210 to a state at the first user program instruction and reset the register file backup system to a register file state at the first user program instruction and loads the new fill into the local cache 208. The fill/backup control 212 then loads the registers in the register scoreboard with data from the coherent fill, except registers that have a not live at first user flag set. Additionally, other MAF entries are examined and any scoreboard entries or first-user instructions occurring later than the backup point are removed for the respective MAF entries. The processor pipeline 203 can then begin executing program instructions again with the new coherent data.

If the coherent data fill is the same as the speculative fill, the fill/backup control 212 provides the coherent signal to the processor pipeline 203 indicating that the processor pipeline 203 has already been provided with the coherent data. The processor pipeline 203 can continue execution, until another load or store instruction is encountered. The MAF entry is then removed from the MAF 216. Although the fill/backup control 212 is illustrated as a single functional element, it is to be appreciated that the fill/backup control 212 can be one or more functional elements, such as a separate fill control and a separate backup control.

Alternatively, speculative and coherent data associated with register loads in the register scoreboard can be compared to determine if any of the registers have been loaded with non-coherent data. If the registers have been loaded with non-coherent data, then the processor is backed up as discussed above. Otherwise, the processor can continue execution with the speculative fill.

It is to be appreciated that any probes from the system, will only see data changes by truly coherently retired stores and will not see any data from stores executed based on a speculative fill. That is probes will only see data in the local cache 208 and not data residing in the cache backup system 210. Additionally, any fence or memory barrier instruction will cause the pipeline to drain such that no memory reference after a fence or barrier will be executed until all coherent data has been resolved. Furthermore, any read or write to an input/output (I/O) control status register (CSR) will cause the pipeline to drain due to side effects associated with I/O CSRs.

Figure 7:
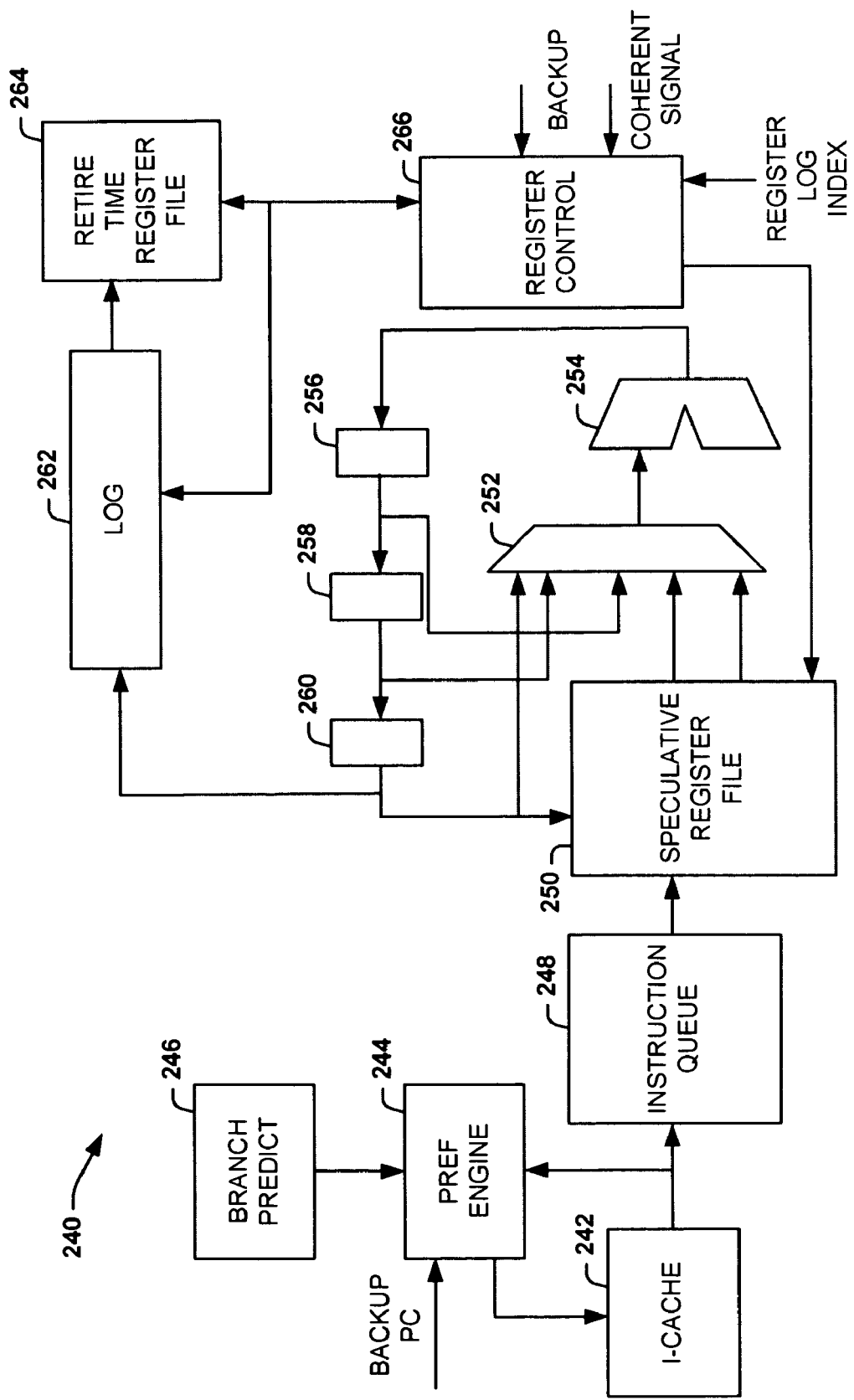
FIG. 7 illustrates a block diagram of a register file backup system in an in-order pipeline.

FIG. 7 illustrates a block diagram of a register file backup system in an in-order pipeline 240. The in-order pipeline 240 includes a branch predictor 246, a pre-fetch engine 244 that includes a program counter (not shown) and an instruction cache 242. The pre-fetch engine 244 retrieves a group of instructions that are provided to an instruction queue 248. The instructions from the instruction queue 248 cause registers to be loaded with data in a speculative register file 250. The data to be loaded into the registers is requested from a cache system with backup (not shown), or in the event of a cache miss is requested from a multi-processor system. The values from the loaded speculative file 250 are provided to a multiplexer 252, which provides the register values to one or more arithmetic logic units 254. The results from the one or more arithmetic logic units are provided to one or more delay boxes 256, 258 and 260. The delay boxes 256, 258 and 260 assure that a corresponding prediction in the branch predictor 246 are completed prior to retiring of an associated instruction to write register values into the speculative register file 250.

The in-order pipeline 240 includes a log 262 and the retire-tine register file 264. The speculative register file 250, the log 262 and the retire-time register file 264 form a register file system that has the capabilities of being set to a register file state associated with a processor execution backup point or state. The speculative register file 250 and the retire-time register file 264 are initialized during an initialization routine with similar values prior to any loading of data into the register files, and the log 262 is flushed. The log 262 retains executed register write entries based on executed writes to registers in the speculative register file 250. Register values in the log 262 associated with executed register write entries are written into the retire-time register file 264 if a speculative data fill associated with the register value is determined to be coherent.

The log 262 is a first-in-first-out (FIFO) (e.g., buffer) of executed register entries that have been written into the speculative register file 250. The log 262 covers the register values that could be backed up because a prior speculative fill is determined to be non-coherent and a new coherent data fill is returned. An executed register write entry exits the log 262 when an executed register write entry is retired. An executed register write entry is retired when data from a speculative fill associated with the register value of the executed register write entry is determined to be coherent and all prior memory references have been resolved. When the executed register write entry exits the log 262, the register value associated with the executed register write entry is written into an associated register in the retire-time register file 264, overwriting any older version of data.

The in-order pipeline 240 includes a register file control 266 that receives coherent signals that indicates whether a particular data fill is coherent. The register control 266 will remove executed register write entries from the log 264 and write associated register values into the retire-time register file 264 as coherency is affirmed. Additionally, the register file control 266 is operative to receive a register file backup index that points to a backup point of the log 262 and a backup signal indicating a backup has been initiated. The backup point in the log 262 corresponds to a register file state associated with a previous processor execution state. It is to be appreciated that a separate register log index and coherent signal can be associated with each source request and speculative fill employed by the processor pipeline 240.

If data of a speculative fill is determined to be non-coherent, the register control 266 will write register values in the log associated with executed register write entries into the retire-time register file 264 to a backup point (e.g., state at a first user program instruction) based on the register log index, and the remaining executed register write entries are flushed from the log 262. The register control 266 will copy the register values in the retire-time register file 264 into the register values of the speculative register file 250 to reset the speculative register file 250 to the backup point. Additionally, the program counter in the pre-fetch engine 244 will be set to a program instruction address associated with a backup point, such that the pipeline can re-execute program instruction at the backup point with a coherent data fill.

FIG. 8 illustrates executed store entries associated with a log 260 of a register file backup system. The log 260 includes a plurality of executed register write entries 262-276 corresponding to executed register writes into a speculative register file. The plurality of executed register write entries 262-276 occur in sequential order such that executed register write entries are retired in a first-in-first-out (FIFO) manner. Each register write entry includes a register name and a register value. The log 260 includes a first entry 262 associated with writing register value #1 into register A, a second entry 264 associated with writing register value #2 into register B, and a third entry 266 associated with writing register value #3 into register C. A fourth entry 268 corresponds to overwriting data in the register B with register value #4. The log 260 includes a fifth entry 270 associated with writing register value #5 into register D. The log 260 includes a sixth entry 272 associated with overwriting data in the register A with register value #6, a seventh entry 274 associated with overwriting register value #7 into register B, and an eighth entry 276 associated with overwriting register value #8 into register C.

A register file log index points to a backup point indicated between the sixth entry 272 and the seventh entry 274. The backup point can be associated with the state of the register file at a first user program instruction, which is a first program instruction that employs data associated with a corresponding speculative fill. If a backup occurs, executed register write entries (262-272) before the backup point are written to a retire-time register file, and executed write entries (274-276) after the backup point are flushed from the log 260. The register values of the retire-tine register file are then written into the speculative register file, such that the speculative register file is now set at the processor execution backup point for re-execution of program instructions employing coherent data.

FIG. 9 illustrates register entries in a speculative register file 280. The speculative register file 280 illustrates the values of the registers associated with register write entries in the log 260 of FIG. 8. As illustrated in FIG. 9, the speculative register file 280 contains register entry 282 with register value #6 in register A, register entry 284 with register value #7 in register B, register entry 286 with register value #8 in register C and register entry 288 with register value #5 in register D. The register values in the registers correspond to the latest executed register write entries 270-276 to register A-D as illustrated in the log 260.

FIG. 10 illustrates register values in a retire time register file 290 in the event that a backup is initiated. If a backup is initiated, the executed write entries in the log 260 are written to the retire-time register file 290 to a backup point indicated by a register file log index, and the remaining executed write entries are flushed from the log. As illustrated in FIG. 10, the retire-time register file 290 contains register entry 292 with register value #6 in register A, register entry 294 with register value #4 in register B, register entry 296 with register value #3 in register C and register entry 298 with register value #5 in register D. The register values in register B and register C have not been overwritten with register value #7 and register value #8, respectively, since executed write entries 274 and 276 have been flushed from the log 260. The register values of the retire-time register file 290 can be written to the registers of the speculative register file 280 to reset the speculative register file 280 to the processor backup point.

It is to be appreciated that FIGS. 8-10 are for illustrative purposes, and a speculative register file and a retire-time register file can have more than four registers (e.g., 32 registers). Additionally, the log 260 can include several thousand instructions with multiple register file indices for pointing to backup points for multiple outstanding source requests in the event that an associated speculative fill is determined to be non-coherent.

Figure 11:
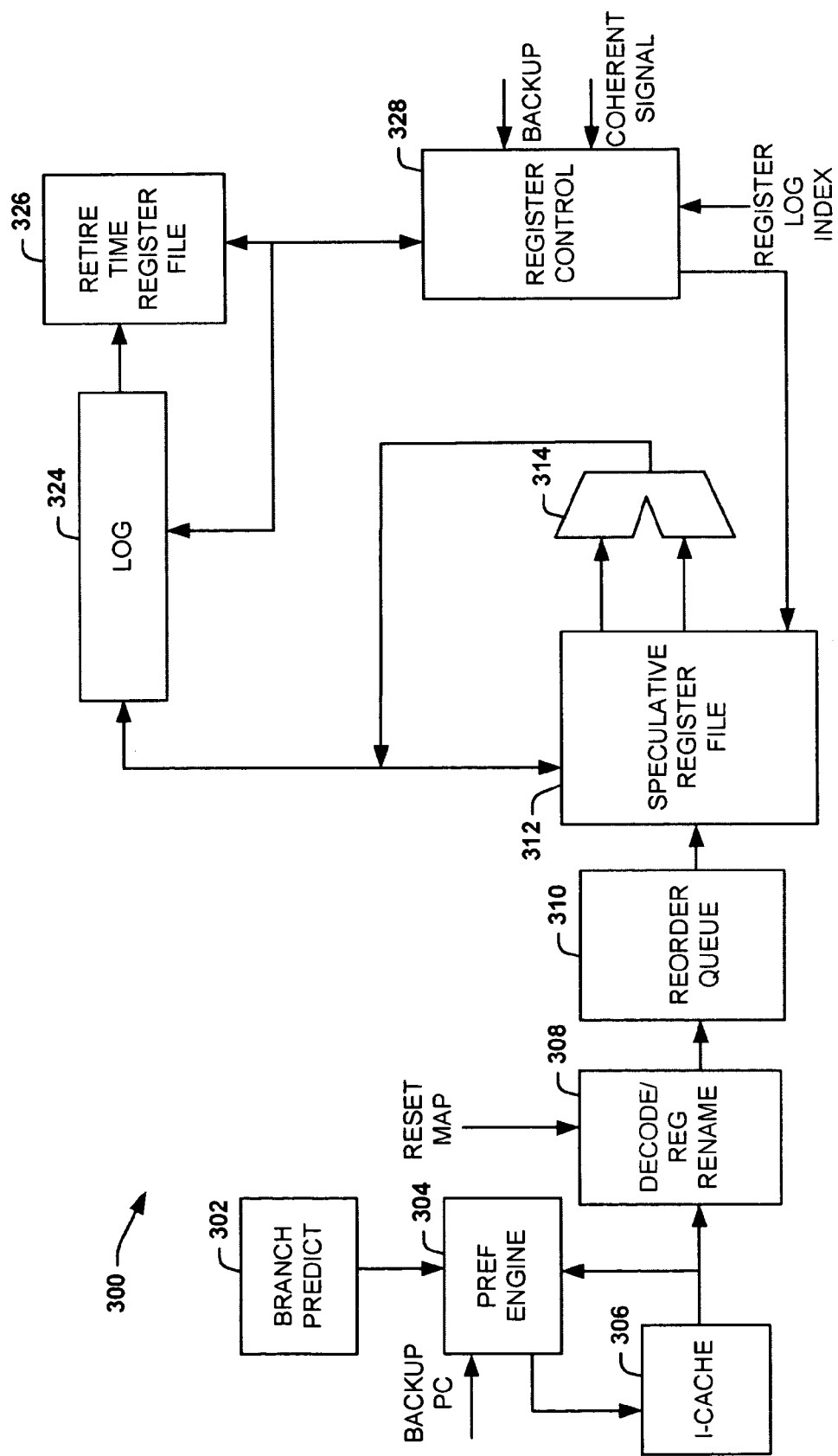
FIG. 11 illustrates a block diagram of a register file backup system in an out-of-order pipeline.

FIG. 11 illustrates a block diagram of a register file backup system in an out-of-order pipeline 300. The out-of-order pipeline 300 includes a branch predictor 302, a pre-fetch engine 304 that includes a program counter (not shown) and an instruction cache 306. The pre-fetch engine 304 retrieves a group of instructions from the instruction cache 306 that are provided to a decode/register rename map 308. The decode/register rename map 308 decodes the register instructions and maps a set of rename registers to a set of registers that can be updated once the instructions are ready to be retired. The decode/register rename component 308 provides a group of instructions to an instruction reorder queue 310. The instruction reorder queue 310 reorders the instruction to optimize execution.

The instructions from the instruction reorder queue 310 cause registers to be loaded with data in a speculative register file 312. The data to be loaded into the registers is requested from a cache system with backup (not shown), or in the event of a cache miss is requested from a multi-processor system. The values from the loaded speculative file 312 are provided to one or more arithmetic logic units 314. The results from the one or more arithmetic logic units 314 are stored in the speculative register file.

The out-of-order pipeline 300 includes a log 324 and a retire-time register file 326. The speculative register file 312, the log 324, the retire-time register file 326 and the ability to reset the register map form a register file system that has the capabilities of being set to a register file state associated with a processor execution backup point or state. The speculative register file 312 and the retire-time register file 326 are initialized with similar values prior to any loading of data into the register files, the log 324 is flushed and the register map is reset during an initialization routine. The log 324 retains executed register write entries based on executed writes to registers in the speculative register file 312. The executed register write entries are not written into the log, until the instructions retire past any out-of-order backup cases. Register values in the log 324 associated with executed register write entries are written into the retire-time register file 326 if a speculative data fill associated with the register value is determined to be coherent.

The out-of-order pipeline 300 includes a register control 328 that receives coherent signals that indicates whether a particular data fill is coherent. The register control will remove executed register write entries from the log 324 and write associated register values into the retire-time register file 326 once the register values have been determined to contain coherent data. Additionally, the register control 328 is operative to receive a register file log index that points to a backup point of the log 324 and a backup signal indicating a backup has been initiated. The backup point in the log corresponds to a register file state associated with a previous processor execution state.

If data of a speculative fill is determined to be non-coherent, the register control 328 will write register values in the log 324 associated with executed register write entries into the retire-time register file 326 to a backup point (e.g., state at a first user program instruction), and the remaining executed register write entries are flushed from the log 324. The register control 328 will copy the register values in the retire-time register file 326 into the register values of the speculative register file 312 to continue program instruction execution from the backup point. Additionally, the map in the decode/register rename map 308 will be reset and a program counter in the pre-fetch engine 304 will be set to a program instruction address associated with the backup point, such that the pipeline can re-execute program instruction at the backup point with a coherent data fill.

Figure 12:
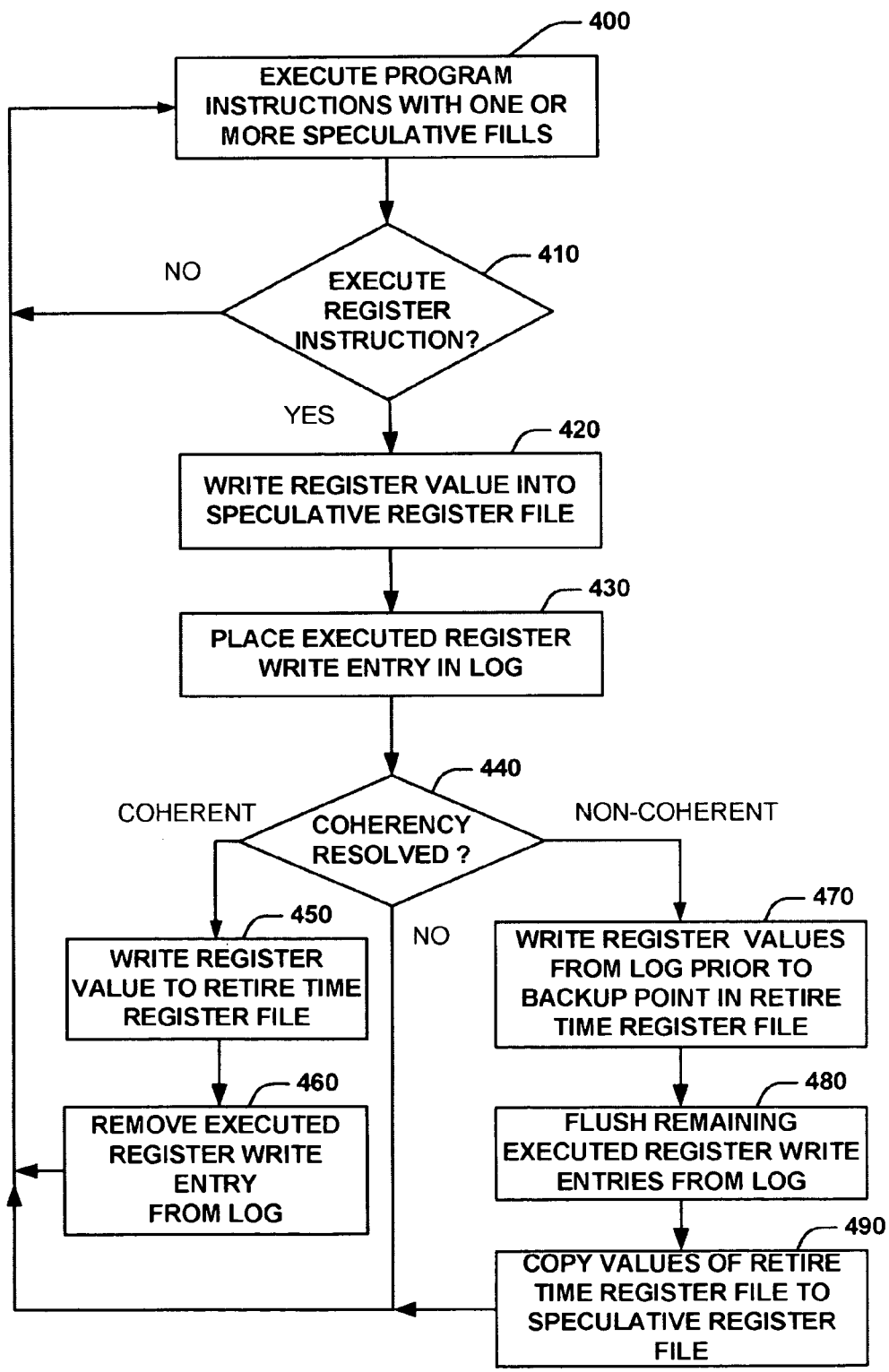
FIG. 12 depicts a flow diagram illustrating a method for executing a processor pipeline with speculative fills.
Figure 13:
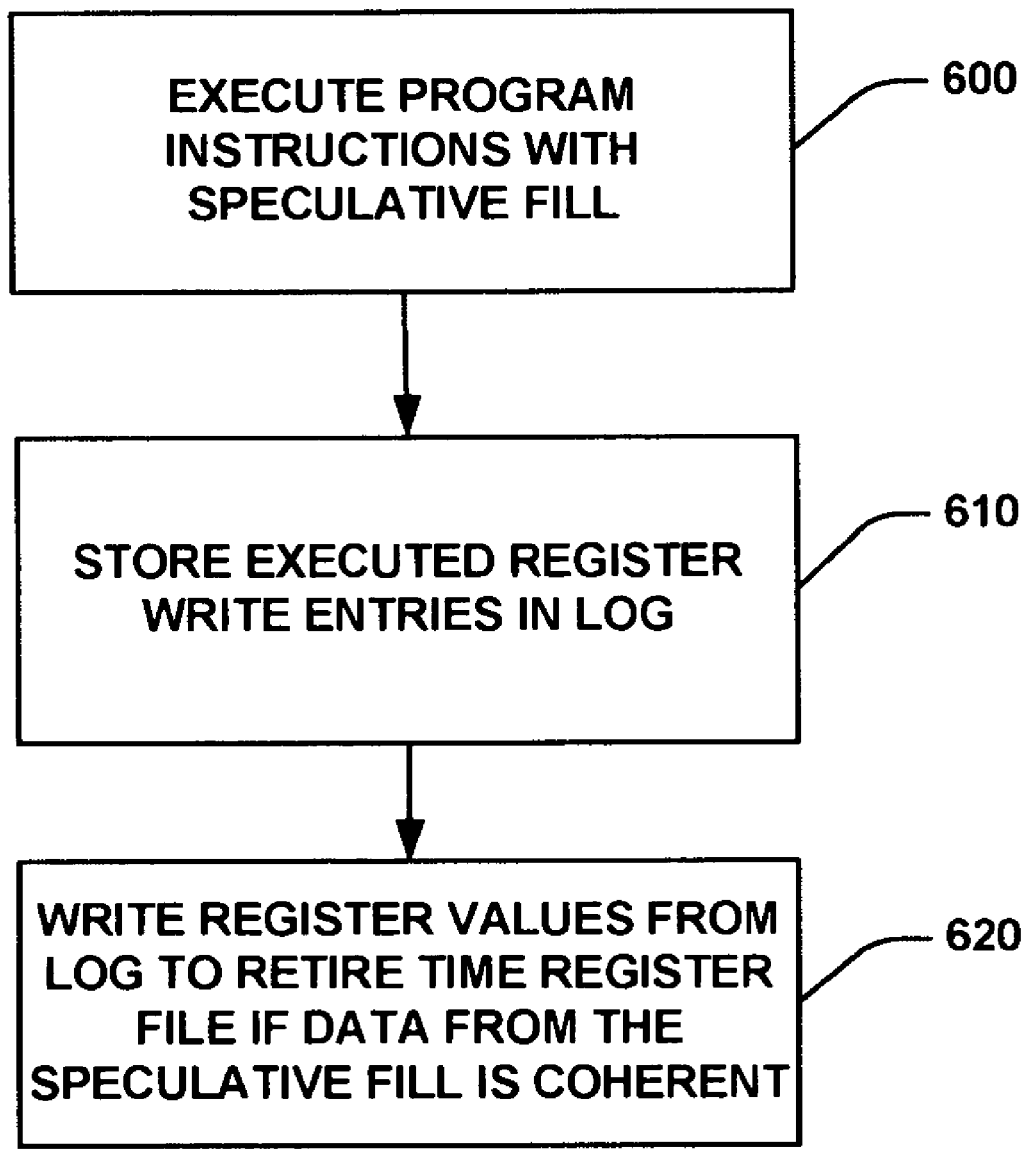
FIG. 13 depicts a flow diagram illustrating another method for executing a processor pipeline with speculative fills.

In view of the foregoing structural and functional features described above, certain methods will be better appreciated with reference to FIGS. 12-13. It is to be understood and appreciated that the illustrated actions, in other embodiments, may occur in different orders and/or concurrently with other actions. Moreover, not all illustrated features may be required to implement a method. It is to be further understood that the following methodologies can be implemented in hardware (e.g., as one or more integrated circuits or circuit boards containing a plurality of microprocessors), software (e.g., as executable instructions running on one or more processors), or any combination thereof.

FIG. 12 depicts a method for executing a processor pipeline with speculative fills. At 400, a processor executes program instructions with one or more speculative fills. The one or more speculative fills are provided in response to one or more source requests issued by the processor. A source request is issued when a load or store instruction results in a cache miss of a local processor cache. At 410, a determination is made on whether a register instruction has been executed. A register instruction is a program instruction that executes an algorithm, such as a mathematical instruction, on one or more register values and writes the results into a register entry, which can be the same or a different register than the one that hold the one or more register values. If a register instruction has not been encountered (NO), the processor continues to execute program instructions at 400. If a register instruction is encountered (YES) at 410, the methodology proceeds to 420. At 420, register values are written into the speculative register file upon completion of the instruction.

At 430, an executed register write entry associated with the register write instruction is added to a log. In an in-order pipeline, an executed register write is completed when the result is written to the speculative register file. In an out-of-order pipeline, an executed register write is completed when instructions retire past any out-of-order backup possibilities. The log can be a first-in-first-out (FIFO) (e.g., buffer) of executed register write entries of register names and register values that have been written into the speculative register file. The log covers the register writes that could be backed up because a prior speculative fill is determined to be non-coherent and a new coherent data fill is returned. The methodology then proceeds to 440 to determine if any coherencies have been resolved for the one or more speculative fills. If any coherencies have not been resolved (NO), the methodology returns to 400 to continue executing program instructions.

If a speculative fill has been determined to be coherent at 440, the methodology proceeds to 450. At 450, executed register write entries in the log associated with the coherent speculative fill are written to a retire-time register file retiring the register write instruction. At 460, the executed register write entries in the log associated with the coherent speculative fill are removed from the log. The methodology returns to 400 to continue execution with one or more speculative fills.

If a speculative fill has been determined to be non-coherent at 440, the methodology proceeds to 470. At 470, executed register write entries in the log prior to a backup point are written to the retire-time register file and removed from the log. At 480, the executed register write entries in the log after the backup point are flushed from the log. The backup point can be a first user point associated with a first user program instruction, which is the first program instruction that employs the speculative fill. At 490, the register values in the retire-tine register file are copied into the registers of the speculative register file. The methodology returns to 400 to continue execution with one or more speculative fills at the backup point.

FIG. 13 depicts a method of executing program instructions employing a speculative fill in a multi-processor system. At 600, program instructions are executed with data from a speculative fill that is provided in response to a source request. At 610, executed register write entries are stored in a log. At 620, register values from the log are written to a retire-time register file if data from the speculative fill is determined to be coherent.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A multi-processor system that conforms to a cache coherency protocol, the system comprising:
    a processor having a processor pipeline that executes program instructions with data from a given speculative fill of at least two speculative fills that are provided to the processor from two or more other processors of the multi-processor system in response to a source request, wherein the at least two speculative fills have an undetermined coherency at a time the at least two speculative fills are provided in response to the source request;
    a first register file that retains register values associated with program instructions employing data from speculative fills;
    a second register file that retains register values associated with data from speculative fills that have been determined to be coherent;
    a log that retains executed register entries based on program instructions that write register values into registers associated with the first register file, the register values being written to the second register file if data of a speculative fill associated with the register values is determined to be coherent; and
    a backup system that initiates a backup to a processor execution backup point in the event that the given speculative fill is determined to be non-coherent, the backup system writes register values associated with executed register entries in the log into the second register file, until a point in the log indicated by the index is reached, the backup system flushing the remaining executed register entries from the log and copying the values of the second register file to the first register file.

2. The system of claim 1, wherein the log is a first-in-first-out (FIFO) buffer of register names and register values that have been written into the first register file.

3. The system of claim 1, wherein the backup system retains an index into the log associated with the processor execution backup point, wherein the index points to a backup point corresponding to a first user program instruction, the first user program instruction being a first program instruction that employs data from the given speculative fill.

4. The system of claim 1, wherein the backup system resets a register rename map associated with the processor pipeline.

5. The system of claim 1, further comprising a request engine that generates a miss address file (MAF) entry associated with a source request, the MAF entry having a plurality of fields that retain backup information that is employed by the backup system in the event that a backup is initiated to return the processor pipeline to a backup point if data associated with the given the speculative fill is determined to be non-coherent.

6. The system of claim 5, wherein the plurality of fields comprises an index into the log, the index points to a backup point in the log associated with a first user program instruction that employs data from the given speculative fill.

7. The system of claim 6, further comprising resetting a register rename map associated with the processor pipeline.

8. The system of claim 1, wherein the register values associated with the second register file overwrite the corresponding register values associated with the first register file if a speculative fill is determined to be non-coherent.

9. The system of claim 1, wherein the processor pipeline reads the first register file in response to a register read instruction.

10. The system of claim 1, wherein the processor pipeline receives a coherent data fill from the multi-processor system after the at least two speculative fills are received in response to the source request.

11. The system of claim 1, wherein the processor pipeline receives a coherent signal generated by the multi-processor system that provides an indication of which of a plurality of data fills received by the processor pipeline in response to a source request is a coherent data fill.

12. The system of claim 1, wherein the processor pipeline comprises one of an out-of-order pipeline and an in-order pipeline.

13. A processor in a multi-processor system that conforms to a cache coherency protocol, the processor comprising:
a processor pipeline that executes program instructions with a given speculative data fill of at least two speculative data fills that are received from two or more other processors of the multi-processor system in response to a source request, wherein the at least two speculative data have an undetermined coherency at a time that the at least two speculative data fills are provided in response to the source request; and
a register file backup system operative to set a register file associated with the processor to a register file state corresponding to a previous processor pipeline execution state in the event that the given speculative data fill is determined to be non-coherent, wherein the register file backup system comprises:
a speculative register file, the processor pipeline writing register values into registers associated with the speculative register file employing data from the given speculative data fill;
a log that retains executed register entries associated with writes to registers associated with the speculative register file; and
a retire-time register file, wherein a register value is written into an associated register in the retire-time register file when a register value corresponding to an executed register entry is determined to be coherent, wherein the register values in the retire-time register file overwrites the corresponding register values in the speculative register file if the given speculative data fill is determined to contain non-coherent data.

14. The processor of claim 13, wherein the multi-processor system employs a cache coherency protocol that causes the system to generate a coherent signal that provides an indication of which of a plurality of data fills received by the processor pipeline is a coherent data fill, the processor employing the coherent signal to determine if the given speculative data fill is non-coherent.

15. The processor of claim 13, wherein the previous processor pipeline execution state corresponds to a processor pipeline execution state at a first user program instruction, and the first user program instruction corresponds to a first program instruction that employs the given speculative data fill associated with the source request.

16. The processor of claim 13, further comprising an index that points to a backup point into the log, the backup point being associated with a first user program instruction, which is the first program instruction that employs data from the given speculative data fill, wherein register values associated with the executed register entries prior to the backup point are written to the retire-time register file and register values associated with the executed register entries after the backup point are flushed from the log in the event the given speculative data fill is determined to be non-coherent.

17. A multi-processor system that employs a cache coherency protocol, the system comprising:
means for executing program instructions associated with a source processor employing a given speculative data fill of at least two speculative data fills received from two or more other processors of the multi-processor system in response to a source request, wherein the at least two speculative data fills have an undetermined coherency at a time the at least two speculative data fills are provided in response to the source request;
means for storing executed register entries associated with writing register values into registers of a first register file based on the at least two speculative data fills;
means for writing register values associated with the executed register entries into a second register file if a speculative data fill associated with the executed register entries is determined to be coherent; and
means for setting the first register file to a backup point if the given speculative fill is determined to be non-coherent comprising means for writing register values associated with the executed register entries to the second register file to the backup point, flushing the executed register entries after the backup point, and copying the register values from the second register file to the first register file.

18. The system of claim 17, further comprising means for providing an indication of which of a plurality of data fills associated with a source request is a coherent data fill.

19. A method of executing program instructions employing a speculative fill in a multi-processor system that conforms to a cache coherency protocol, the method comprising:
executing program instructions on a processor of the multi-processor system with data from a given speculative fill of at least two speculative fills that are provided from at least two other processors of the multi-processor system in response to a source request, wherein the at least two speculative fills have an undetermined coherency at a time the at least two speculative fills are provided in response to the source request;
storing executed register entries in a log associated with executed register write instructions based on data from the at least two speculative fills;
writing register values associated with a respective executed register entry from the log to an associated register in a retire-time register file, if data from the given speculative fill associated with an executed register entry has been determined to be coherent;
writing register values associated with register write instructions to a speculative register file based on data from the given speculative fill; and
copying register values from the retire-time register file to the speculative register file, if data from the given speculative fill associated with an executed register entry has been determined to be non-coherent.

20. The method of claim 19, wherein each of the executed register entries comprises a register name and a register value associated with a respective executed register write instruction.

21. The method of claim 19, further comprising setting the retire-time register file to a backup point if the given speculative fill is determined to be non-coherent by writing register values associated with a respective executed register entry from the log to an associated register in a retire-time register file prior to the backup point and flushing the executed register entries from the log after the backup point.

22. The method of claim 21, further comprising generating a miss address file (MAF) entry associated with the source request, and storing an index that points to the backup point in the MAF entry.

23. The method of claim 22, the backup point being associated with a first user program instruction, which is a first program instruction that employs data from the given speculative fill.

24. A method of executing program instructions employing a speculative fill in a multi-processor system that conforms to a cache coherency protocol, the method comprising:

executing program instructions on a processor of the multi-processor system with data from a given speculative fill of at least two speculative fills that are provided from at least two other processors of the multi-processor system in response to a source request, wherein the at least two speculative fills have an undetermined coherency at a time the at least two speculative fills are provided in response to the source request;

updating register values in a speculative register file based on the executed program instructions;

updating register values in a retire-time register file when data corresponding to the updated register values in the speculative register file is based on a coherent speculative fill; and copying the register values of the retire-time register file to the speculative register file when data corresponding to the updated register values in the speculative register file is based on non-coherent speculative fills.

25. The method of claim 24, further comprising storing executed register write entries in a log associated with updating register values in a speculative register file.

26. The method of claim 25, the updating register values in a retire-time register file further comprising writing register values based on executed register write entries into the retire-time register file when register values in the speculative register file are based on coherent speculative fills.

27. The method of claim 25, further comprising setting the retire-time register file to a backup point if the given speculative fill is determined to be non-coherent by writing register values associated with a respective executed register entry from the log to an associated register in a retire-time register file prior to the backup point and flushing the executed register entries from the log after the backup point.

* * * * *

UNITED STATES PATENT AND TRADEMARK OFFICE
CERTIFICATE OF CORRECTION

PATENT NO. : 7,409,503 B2  Page 1 of 1
APPLICATION NO. : 10/756644
DATED : August 5, 2008
INVENTOR(S) : Simon C. Steely, Jr. et al.

It is certified that error appears in the above-identified patent and that said Letters Patent is hereby corrected as shown below:

In column 4, line 35, delete "PROCESSOR I" and insert -- PROCESSOR 1 --, therefor.

In column 6, lines 45-46, delete "retire-tine" and insert -- retire-time --, therefor.

In column 12, line 18, delete ""0011"" and insert -- "001" --, therefor.

In column 13, line 63, delete "retire-tine" and insert -- retire-time --, therefor.

In column 16, lines 1-2, delete "retire-tine" and insert -- retire-time --, therefor.

In column 17, line 21, delete "retire-tine" and insert -- retire-time --, therefor.

In column 19, line 59, delete "retire-tine" and insert -- retire-time --, therefor.

Signed and Sealed this

Eleventh Day of November, 2008

JON W. DUDAS
*Director of the United States Patent and Trademark Office*